US009912761B2

(12) United States Patent
Amano (10) Patent No.: US 9,912,761 B2
(45) Date of Patent: Mar. 6, 2018

(54) COMMUNICATION SYSTEM, COMMUNICATION METHOD, COMMUNICATION APPARATUS, METHOD OF CONTROLLING THE SAME, AND COMPUTER PROGRAM (71) Applicant: CANON KABUSHIKI KAISHA, Tokyo (JP)

(72) Inventor: Ryosuke Amano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/308,660

(22) PCT Filed: Jun. 8, 2015

(86) PCT No.: PCT/JP2015/067102
§ 371 (c)(1),
(2) Date: Nov. 3, 2016

(87) PCT Pub. No.: WO2016/009762
PCT Pub. Date: Jan. 21, 2016

(65) Prior Publication Data
US 2017/0195432 A1 Jul. 6, 2017

(30) Foreign Application Priority Data

Jul. 18, 2014 (JP) ................................. 2014-148162

(51) Int. Cl.
*H04W 4/00* (2009.01)
*H04L 29/08* (2006.01)
(Continued)

(52) U.S. Cl.
CPC .......... *H04L 67/16* (2013.01); *H04L 41/5058* (2013.01); *H04W 4/005* (2013.01);
(Continued)

(58) Field of Classification Search
CPC ..... H04W 76/02; H04W 84/10; H04W 84/12; H04W 88/06; H04W 88/04; H04W 76/026
(Continued)

(56) References Cited

U.S. PATENT DOCUMENTS 8,380,177 B2 * 2/2013 Laracey ............. G06Q 30/0253
370/259
8,958,100 B2 2/2015 Nishikawa et al. .. G06F 3/1236
(Continued)

FOREIGN PATENT DOCUMENTS

CN 103369454 A 10/2013
CN 103686943 3/2014
(Continued)

OTHER PUBLICATIONS

NFC Forum homepage, Internet < http://nfc-forum.org/ >, Connection Handover 1.2, NFCForum-tS-ConnectionHandover_1_2.doc, Jul. 7, 2010.
(Continued)

Primary Examiner — Marceau Milord
(74) Attorney, Agent, or Firm — Fitzpatrick, Cella, Harper & Scinto (57) ABSTRACT A communication apparatus includes a storage unit that stores service information corresponding to a service which can be read by another communication apparatus by a first wireless communication method, a communication unit that communicates with the other communication apparatus by a second wireless communication method, and an acquiring unit that acquires from the other communication apparatus, which read the service information from the storage unit, a message indicating whether a service corresponding to the service information is executable. A determination unit determines, based on the message, whether to start execution
(Continued)

of the service with the other communication apparatus, and a detection unit detects that reading of the storage unit is performed by the other communication apparatus. The determination unit determines whether to start execution of the service based on the acquired message after it is detected that reading of the storage unit is performed.

13 Claims, 6 Drawing Sheets

(51) Int. Cl.
    *H04L 12/24*     (2006.01)
    *H04W 84/12*     (2009.01)
    *H04W 4/02*     (2018.01)
    *H04W 8/08*     (2009.01)
    *H04W 76/02*     (2009.01)
    *H04W 8/20*     (2009.01)
    *H04L 12/801*     (2013.01)

(52) U.S. Cl.
    CPC ............ *H04W 4/008* (2013.01); *H04W 4/02* (2013.01); *H04W 8/082* (2013.01); *H04W 8/205* (2013.01); *H04W 76/02* (2013.01); *H04W 84/12* (2013.01); *H04L 47/11* (2013.01)

(58) Field of Classification Search
    USPC .................................. 455/435.2, 552.1, 41.1
    See application file for complete search history.

(56) References Cited

U.S. PATENT DOCUMENTS

| | | | | |
|---|---|---|---|---|
| 9,414,435 B2* | 8/2016 | Suzuki | ................. | H04W 88/06 |
| 9,510,392 B2 | 11/2016 | Kawakami | | |
| 9,516,502 B2* | 12/2016 | Amano | ................. | H04W 12/06 |
| 9,628,943 B2* | 4/2017 | Amano | ................. | H04W 4/008 |
| 2012/0016961 A1* | 1/2012 | Tuikka | ................... | G06Q 10/10 |
| | | | | 709/217 |
| 2012/0045989 A1* | 2/2012 | Suumaki | ............... | H04W 8/005 |
| | | | | 455/41.1 |
| 2013/0260818 A1* | 10/2013 | Suzuki | ................. | H04W 88/06 |
| | | | | 455/552.1 |
| 2014/0063537 A1* | 3/2014 | Nishikawa | ............ | H04W 4/008 |
| | | | | 358/1.15 |
| 2014/0222729 A1* | 8/2014 | Dasgupta | ............. | G06N 99/005 |
| | | | | 706/12 |
| 2014/0256255 A1* | 9/2014 | Thomas | .................... | G06F 9/54 |
| | | | | 455/41.1 |
| 2014/0320874 A1* | 10/2014 | Tredoux | ............. | G06K 15/4095 |
| | | | | 358/1.13 |
| 2015/0018037 A1 | 1/2015 | Kawakami et al. | .. | H04W 88/06 |
| 2015/0019613 A1 | 1/2015 | Amano | ................... | H04L 67/10 |
| 2016/0316353 A1* | 10/2016 | Kawakami | ........... | H04W 4/008 |
| 2016/0316511 A1* | 10/2016 | Suzuki | ................. | H04W 88/06 |

FOREIGN PATENT DOCUMENTS

| | | |
|---|---|---|
| CN | 103686943 A | 3/2014 |
| EP | 2 645 811 A2 | 10/2013 |
| EP | 2 704 410 A1 | 3/2014 |
| JP | 2013-214803 A | 10/2013 |
| JP | 2014-050015 A | 3/2014 |
| WO | WO 2013/136876 A1 | 9/2013 |
| WO | WO 2013-136876 A1 | 8/2015 |

OTHER PUBLICATIONS

Wi-Fi Alliance homepage, Internet < http://www.wi-fi.org/discover-wi-fi/wi-fi-direct >, Wi-Fi Alliance Technical Committee P2P Task Group, WiFi Peer-to-Peer (P2P) Technical Specification; 2010, Version 1.1, pp. 1-160.

* cited by examiner

COMMUNICATION SYSTEM, COMMUNICATION METHOD, COMMUNICATION APPARATUS, METHOD OF CONTROLLING THE SAME, AND COMPUTER PROGRAM

CROSS REFERENCE TO RELATED APPLICATION

The present application is a national-stage entry under 35 U.S.C. § 371 of International Application No. PCT/JP2015/067102, filed Jun. 8, 2015, and claims the benefit of foreign priority under 35 U.S.C. § 119 of Japanese Application No. 2014 -148162 filed on Jul. 18, 2014.

TECHNICAL FIELD

The present invention relates to a communication system, a communication method, a communication apparatus, a method of controlling the same, and a computer program.

BACKGROUND ART

In recent years, the Wi-Fi Alliance, which is a wireless LAN world organization, has established a Wi-Fi Direct standard (Wi-Fi Alliance homepage, Internet <http://www.wi-fi.org/discover-wi-fi/wi-fi-direct >). In Wi-Fi Direct, a function (service discovery function) is defined as an option function in which before executing wireless LAN connection processing, service information for services that are supported by higher ranking applications is advertised/searched. According to this service discovery function, before performing connection processing, a service of a terminal in the vicinity is searched using a wireless LAN Probe Request, and it is possible to advertise a service of the self-terminal using a Probe Response packet. By using the service discovery function, when a service to search for is instructed by a user operation, the terminal starts a search for the service, and displays a list of terminals that provide the service. Additionally, when a partner terminal with which communication is performed is selected by a user operation, wireless LAN connection processing by Wi-Fi Direct with said partner terminal is executed and the service can be executed.

Also, in recent years, mounting of NFC (Near Field Communication) technology in terminal devices as described above is starting to spread. By a user simply performing an operation of having terminals approach each other, a one-to-one communication path is established by NFC, and transmitting/receiving of data can be performed between the terminals. Also, in the NFC Forum which is an NFC world organization, technology for handover from NFC to different wireless communication methods, such wireless LAN (IEEE 802.11 series), Bluetooth (registered trademark) or the like, is standardized (NFC Forum homepage, Internet <http://nfc-forum.org/>). By using the present technique, a user is able to perform wireless LAN connection processing or the like simply by performing an operation to have terminals approach each other.

As described above, the service discovery function of Wi-Fi Direct does not consider an approach of searching/advertising service information that uses NFC; it is necessary to select a terminal that executes a desired service by a user operation, and the operation is cumbersome.

SUMMARY OF INVENTION

The present invention was conceived in view of the above described problem, and the present invention provides a technique by which it is possible to make a service executable by specifying a communication partner terminal that is capable of executing a desired service simply by performing an operation of causing terminals to approach each other.

According to one aspect of the present invention, a communication system includes a first communication apparatus and a second communication apparatus, wherein the first communication apparatus includes: storage means for, in the case where a service executed by a second wireless communication method is selected, storing service information corresponding to the service which can be read by the second communication apparatus by a first wireless communication method; and communication means capable of communicating with the second communication apparatus by the second wireless communication method, and wherein the second communication apparatus includes: reading means for reading the service information from the first communication apparatus by the first wireless communication method; determination means for determining whether or not a service corresponding to the service information is executable; transmission means for transmitting a message indicating whether or not the service corresponding to the service information is executable to the first communication apparatus; and execution means for executing, in a case where the service corresponding to the service information is executable, the service corresponding to the service information with the first communication apparatus by communication according to the second wireless communication method.

According to another aspect of the present invention, a communication apparatus includes: first communication means, which performs wireless communication by a first communication method having a first mode and a second mode, for performing wireless communication by the second mode in which information stored in storage means is read by another communication apparatus operating in the first mode; second communication means for performing wireless communication by a second communication method; control means for, in a case where communication processing for which execution is requested of the other communication apparatus is selected, causing information for requesting the execution of the communication processing and a connection by the second communication method to be stored in the storage means; acquiring means for, in a case where communication by the first communication means with the other communication apparatus is initiated in a state in which the communication processing for which the execution is requested of the other communication apparatus is selected, acquiring from the other communication apparatus a message indicating whether or not the communication processing is executable; and execution means for executing the communication processing with the other communication apparatus by communication by the second communication means, based on the message acquired by the acquiring means.

According to still another aspect of the present invention, a communication apparatus, includes: storage means for, in the case where a service executed by a second wireless communication method is selected, storing service information corresponding to the service which can be read by another communication apparatus by a first wireless communication method; communication means capable of communicating with the other communication apparatus by the second wireless communication method, acquiring means for acquiring from the other communication apparatus, which read the service information from the storage means, a message indicating whether or not a service corresponding to the service information is executable; and determination means for determining based on the message whether or not to start execution of the service by the second wireless communication method with the other communication apparatus.

According to yet another aspect of the present invention, a communication apparatus, includes: first communication means having storage means for storing service information corresponding to a service which can be read by another communication apparatus by a first wireless communication method; second communication means capable of communicating with the other communication apparatus by a second wireless communication method, acquiring means for acquiring by the second communication means from the other communication apparatus, which read the service information from the storage means, a message indicating whether or not a service corresponding to the service information can be executed; and determination means for determining whether or not to establish a connection by the second wireless communication method with the other communication apparatus based on the message.

According to still yet another aspect of the present invention, a communication apparatus includes: transmission means for transmitting service information corresponding to a service to another communication apparatus by a first wireless communication method, reception means for receiving a message indicating whether or not a service corresponding to the service information is executable from the other communication apparatus by a second wireless communication method; and determination means for determining whether or not to start execution of the service by the second wireless communication method with the other communication apparatus based on the message.

According to yet still another aspect of the present invention, a communication apparatus includes: reception means for receiving service information corresponding to a service from another communication apparatus by a first wireless communication method, determination means for determining whether or not a service corresponding to the service information can be provided by a second wireless communication method; and transmission means for transmitting a message indicating whether or not the service corresponding to the service information is executable by the second wireless communication method.

According to still yet another aspect of the present invention, a communication method in a communication system including a first communication apparatus for storing service information corresponding to a service which can be read by a first wireless communication method, and a second communication apparatus, wherein the method includes: in the second communication apparatus, a reading step of reading means reading service information from the first communication apparatus by the first wireless communication method; a determination step of determination means determining whether or not a service corresponding to the service information is executable; and a provision step of provision means executing by the second wireless communication method the service for the first communication apparatus in a case where it is determined that the service corresponding to the service information is executable.

According to yet still another aspect of the present invention, a method of controlling a communication apparatus having storage means for storing service information corresponding to a service which can be read by another communication apparatus by a first wireless communication method, the method includes: a reception step of reception means receiving from the other communication apparatus, which read the service information from the storage means, a message indicating whether or not a service corresponding to the service information is executable; and a determination step of determination means determining whether or not to start execution of the service by a second wireless communication method with the other communication apparatus based on the message.

According to still yet another aspect of the present invention, a method of controlling a communication apparatus, includes: a reception step of reception means receiving service information corresponding to a service from another communication apparatus by a first wireless communication method, a determination step of determination means determining whether or not a service corresponding to the service information can be provided by a second wireless communication method; and a transmission step of transmission means transmitting a message indicating whether or not the service corresponding to the service information is executable to the second wireless communication method.

Further features of the present invention will become apparent from the following description of exemplary embodiments (with reference to the attached drawings).

DESCRIPTION OF EMBODIMENTS

Hereinafter, an explanation is given of the details of an embodiment of the present invention with reference to the accompanying drawings.

(Communication System)

Figure 1:
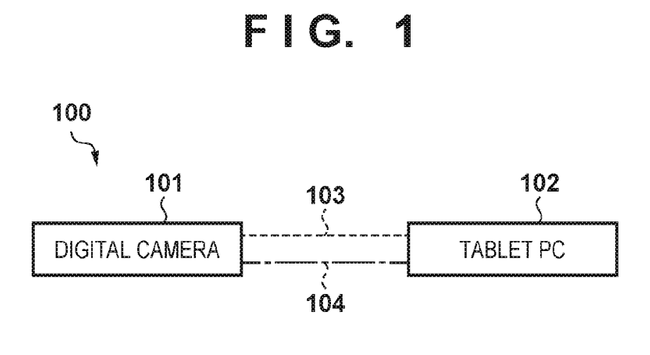
FIG. 1 is a view for illustrating an example configuration of a communication system.

Hereinafter, an explanation will be given of details concerning a communication apparatus and a communication system according to an embodiment of the present invention with reference to the drawings. FIG. 1 is a block diagram for showing a device configuration of a communication system 100 according to the present embodiment that will be explained below. Reference numerals 101 and 102 are communication apparatuses according to the present embodiment, and reference numeral 101 is a digital camera, while reference numeral 102 is a tablet PC. The tablet PC 102 is capable of using an NFC communication 103 for communication with the digital camera 101. Additionally, in the present embodiment, the tablet PC 102 comprises an NFC reader/writer, and while an explanation will be given where communication for reading/writing of an NFC tag of the digital camera 101 is assumed, a configuration may be taken such that communication is performed from both sides. Also, communication is possible between the digital camera 101 and the tablet PC 102 using a wireless LAN communication 104. Additionally, in the present embodiment, an explanation will be given for an example in which communication is performed between the digital camera and the tablet PC, however, the communication apparatuses that are comprised in the communication system are not limited. For example, it is possible to use an information device such as a PC (personal computer), a smart phone, a printer, or the like, as communication apparatuses according to the present embodiment.

(Hardware Configuration of the Digital Camera)

Figure 2:
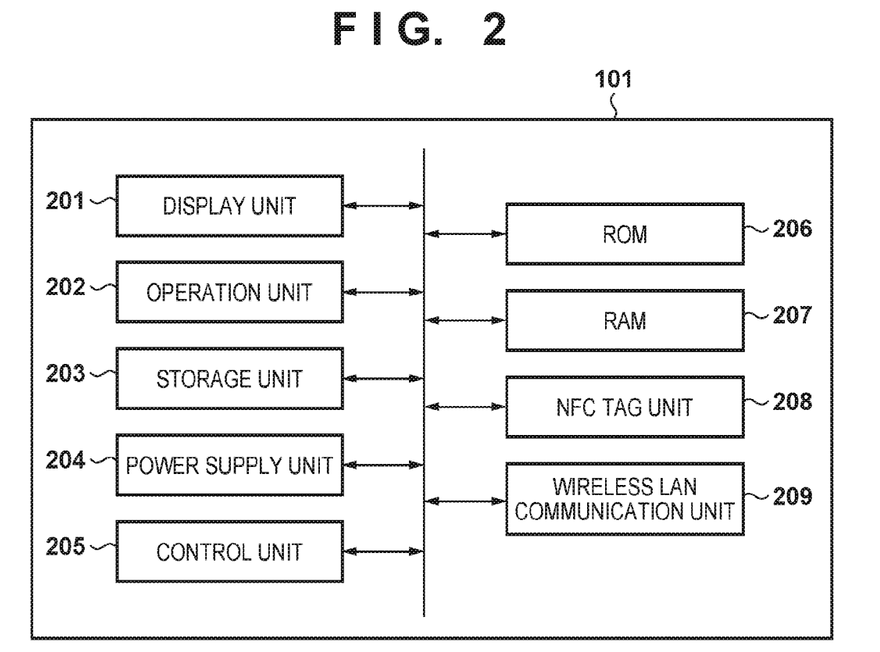
FIG. 2 is a block diagram for showing an example of a hardware configuration of a digital camera.

Continuing on, an explanation will be given with reference to FIG. 2 for a hardware configuration of the digital camera 101. FIG. 2 is a figure showing a hardware configuration of the digital camera 101. As shown in FIG. 2, the digital camera 101 comprises a display unit 201, an operation unit 202, a storage unit 203, a power supply unit 204, a control unit 205, a ROM 206, a RAM 207, an NFC tag unit 208, and a wireless LAN communication unit 209.

The display unit 201 has a function for outputting information that is visibly recognizable, and performs display of UIs (user interfaces) corresponding to applications. The display unit 201 is configured from, for example, an LCD (liquid crystal display) or an LED (light emitting diode) or the like. The operation unit 202 comprises a function for a user to perform various input, or the like, to operate the communication apparatus. The operation unit 202 is configured from, for example, a touch panel, a button, a keyboard or the like. The storage unit 203 is, for example, configured from an HDD (hard disk drive), an SSD (solid state drive), an IC memory or the like, and stores and manages various data such as wireless communication network information, data transmission/reception information, image data or the like. The power supply unit 204 is, for example, a battery, which stores power for operating the apparatus on the whole, and provides power to each piece of hardware.

The control unit 205 is, for example, a CPU (Central Processing Unit), and the control unit 205 controls operation of each configuration element of the digital camera 101. The ROM 206 is a memory dedicated to reading, and the ROM 206 stores computer programs and data of control instructions. Various operations that are explained later are realized by the control unit 205 executing a computer program that is stored to a storage apparatus of the ROM 206 or the like. The RAM 207 is memory that is writeable, and the RAM 207 is used for temporary storage of data and as a work memory when executing a program.

The NFC tag unit 208 is a communication apparatus for performing the NFC communication 103 as a first wireless communication method. The NFC tag unit 208 includes non-volatile memory internally, and through the NFC communication 103, the NFC tag unit 208 is able to allow a reader/writer to read/write data stored to this memory. Data of the internal memory of the NFC tag unit 208 can be read and written based on control of the control unit 205. The NFC tag unit 208 operates in a card emulation mode that is defined by the NFC Forum.

Additionally, while in the present embodiment, the NFC tag unit 208 will be explained as a configuration element of the digital camera 101, it is possible to replace it with the same hardware as an NFC communication unit 308 described later. NFC communication is possible when a communication apparatus approaches within a predetermined distance. The wireless LAN communication unit 209 is a communication apparatus that performs the wireless LAN communication 104 as a second wireless communication method. The wireless LAN communication unit 209 performs wireless communication in compliance with the IEEE 802.11 series. Additionally, while in the present embodiment, the wireless LAN communication unit 209 is explained assuming performing wireless communication in compliance with the IEEE 802.11 series, communication in compliance with another communication method such as Bluetooth (registered trademark) or the like may be used.

(Hardware Configuration of the Tablet PC)

Figure 3:
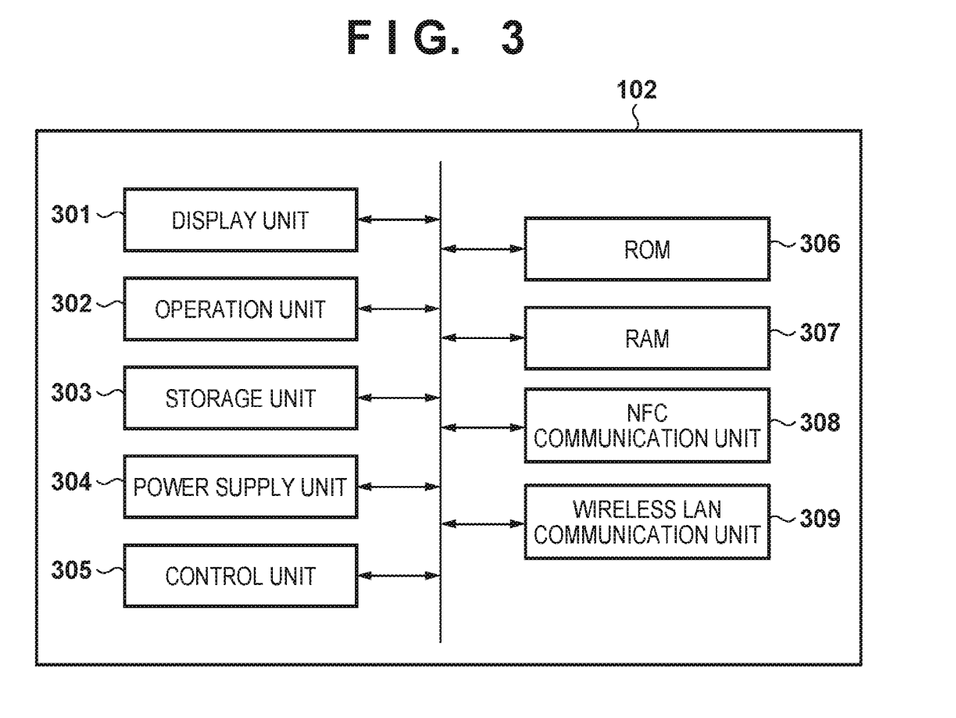
FIG. 3 is a block diagram for showing an example of a hardware configuration of a tablet PC.

Continuing on, an explanation will be given with reference to FIG. 3 for a hardware configuration of the tablet PC 102. FIG. 3 is a figure showing a hardware configuration of the tablet PC 102.

The tablet PC 102 comprises the NFC communication unit 308. The NFC communication unit 308 is a configuration element that performs wireless communication in compliance with NFC (Near Field Communication). Also, the NFC communication unit 308 automatically establishes the NFC communication 103 when an apparatus that is capable of communicating within a communication range is detected. In the present embodiment, the NFC communication unit 308 operates as a reader/writer (R/W), and is able to perform reading processing for reading data of the internal memory of the NFC tag unit 208. The NFC communication unit 308 operates in a reader/writer mode defined by the NFC Forum. The reader/writer mode reads data of tag memory of another apparatus that operates in a card emulation mode, or writes data to tag memory.

Additionally, while the NFC communication 103 is explained as wireless communication that is performed in compliance with NFC, it is not limited to this. For example, it is possible to use a communication method wherein a communication range is short or a communication method wherein a communication rate is slow by the communication scheme used by the wireless LAN communication 104. For example, the NFC communication 103 may use a Bluetooth Low Energy (BLE) scheme defined by Bluetooth 4.0.

The tablet PC 102 additionally comprises a display unit 301, an operation unit 302, a storage unit 303, a power supply unit 304, a control unit 305, a ROM 306, a RAM 307, and a wireless LAN communication unit 309. Since the configurations of these are the same as in the digital camera 101, explanation of these will be omitted.

(Functional Blocks of the Communication Apparatuses)

Next, an explanation will be given for functional blocks of the digital camera 101 and the tablet PC 102 with reference to FIG. 4 and FIG. 5. In the present embodiment, functional blocks of the digital camera 101 and the tablet PC 102 are stored as computer programs in storage apparatuses such as the respective ROMs 206 and 306. The functional blocks are executed by executing the computer programs with the control units 205 and 305. The control units 205 and 305 realize each function by performing control of each piece of hardware according to a control program, and calculation of information and processing. Note, a part or all of the functions contained in the functional blocks may be implemented in hardware. In this case, a part or all of the functions contained in each of the functional blocks is configured from, for example, an ASIC (Application Specific Integrated Circuit).

Figure 4:
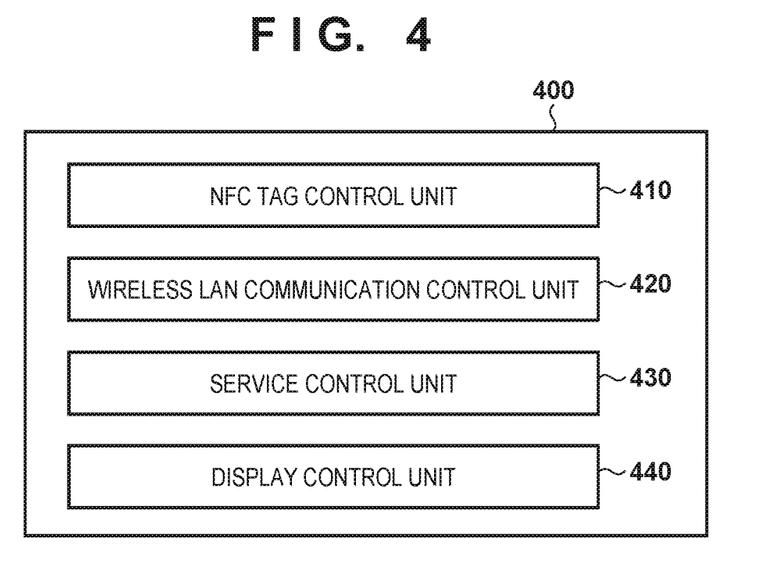
FIG. 4 is a view for illustrating an example of functional blocks of the digital camera.

FIG. 4 is a functional block diagram of the digital camera 101. The digital camera 101 (400) comprises an NFC tag control unit 410, a wireless LAN communication control unit 420, a service control unit 430, and a display control unit 440. The NFC tag control unit 410 comprises a function for reading/writing data of the internal memory of the NFC tag unit 208. Also, the NFC tag control unit 410 comprises a function for detecting whether the NFC communication 103 is established. The wireless LAN communication control unit 420 is a processing device that controls wireless LAN communication through the wireless LAN communication unit 209. Also, the wireless LAN communication control unit 420 comprises, a Station (STA) function for operating as a wireless LAN terminal, and an AP function for operating as an access point (an AP). Also, the wireless LAN communication control unit 420 comprises a service discovery function of Wi-Fi Direct. The service discovery function is able to perform advertisement of a service provided by the self-apparatus, and is able to search for a service provided by another apparatus using a Probe Request/Response packet or the like. Additionally, service discovery may be performed using other protocols. The service control unit 430 is a processing device that controls performance of a service provided by a self-apparatus, and usage of a service provided by another apparatus. The display control unit 440 is a processing device that controls output to the display unit 301 and input from the operation unit 302.

Additionally, in Wi-Fi Direct, a communication apparatus that performs an operation corresponding to an AP function is referred to as the P2P group owner (hereinafter referred to as GO), and a communication apparatus that performs an operation that corresponds to an STA function is referred to as a P2P client (hereinafter referred to as CL). These roles are determined by GO Negotiation protocol, and defined in the Wi-Fi Direct specification. In Wi-Fi Direct a network constructed by the GO is also referred to as a P2P group. In the present embodiment, there is also a case where a network is described as a P2P group, however both mean the same thing.

Additionally, in the present embodiment, the GO and the CL that perform Wi-Fi Direct communication and a communication device group whose role is undetermined are collectively referred to as P2P devices. The P2P devices can both join in a wireless network (execute a CL function) and construct a wireless network (execute a GO function). Whether to operate as the GO or to operate as the CL is determined automatically by executing a protocol of Wi-Fi Direct. Then, operation is performed in the determined role, and wireless connection and wireless communication are performed. Also, when using Wi-Fi Direct to connect between apparatuses, a communication parameter is provided from the GO to the CL, and the communication parameter is used to connect. The communication parameter includes various wireless communication parameters for performing wireless communication in compliance with the IEEE 802.11 standard. In other words, the communication parameter includes wireless communication parameters required for performing wireless LAN communication such as an SSID which is a network identifier, an encryption method, an encryption key, an authentication method, a MAC address, an authentication key, or the like. Also, an IP address for performing communication in an IP layer may be included.

Figure 5:
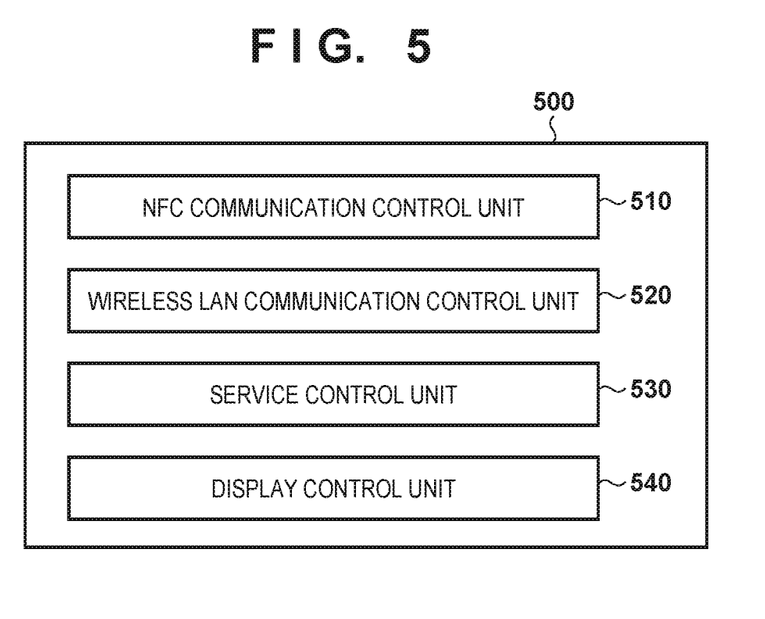
FIG. 5 is a view for illustrating an example of functional blocks of the tablet PC.

FIG. 5 is a functional block diagram of the tablet PC 102. The tablet PC 102(500) comprises an NFC communication control unit 510, a wireless LAN communication control unit 520, a service control unit 530, and a display control unit 540. The NFC communication control unit 510 is a processing device for controlling the NFC communication 103 through the NFC communication unit 308. Since other functional blocks are the same as in the digital camera 101, explanation of these will be omitted.

(Operational Procedure of the Digital Camera)

Figure 6:
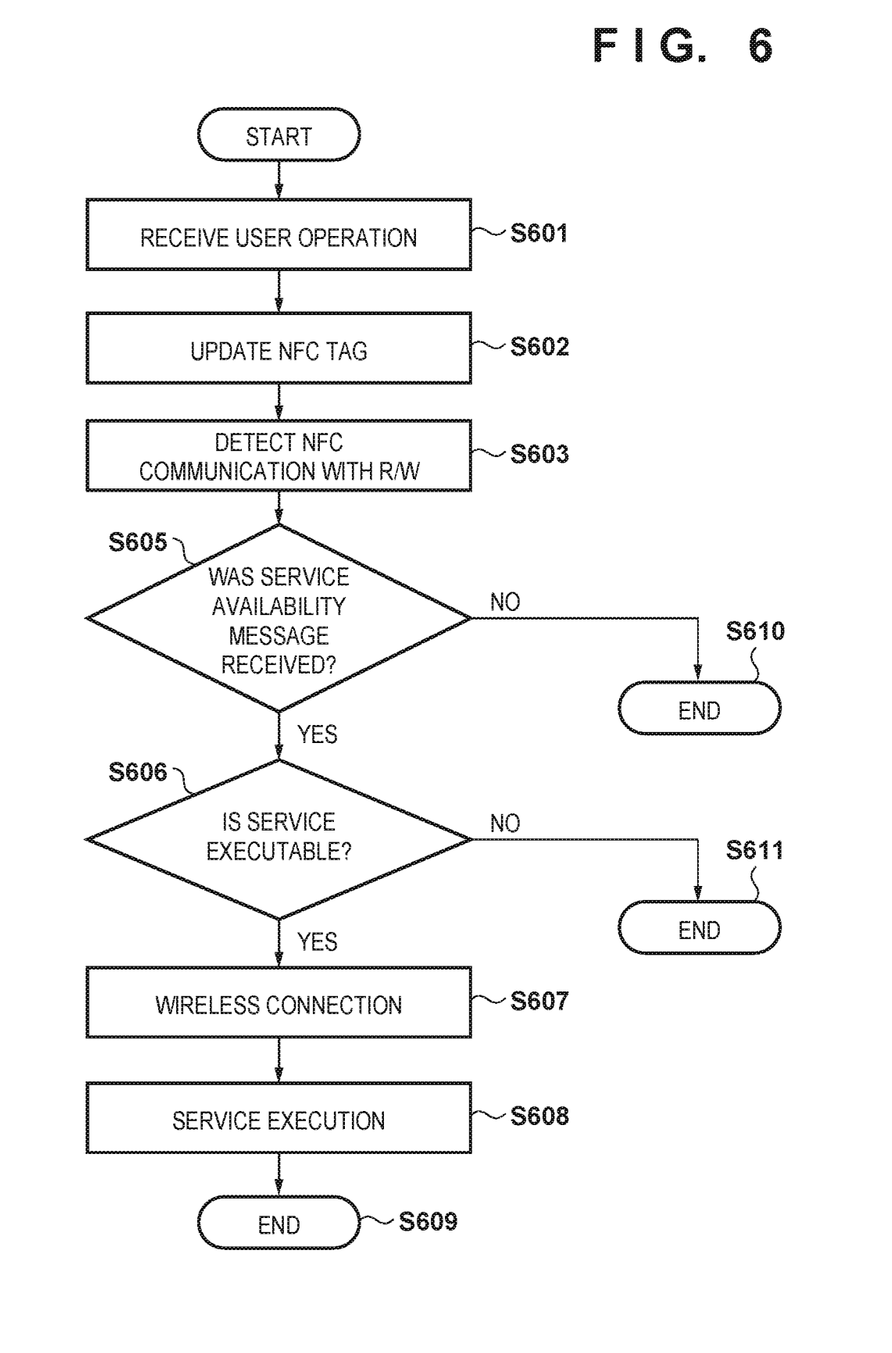
FIG. 6 is a flowchart for showing an operational flow of the digital camera.

An explanation will be given below for operation of the digital camera 101 and the tablet PC 102 included in the above described configuration, with reference to FIG. 6 and FIG. 7. FIG. 6 is a flowchart for showing an operational procedure of the digital camera 101.

Firstly, the digital camera 101 detects that an instruction for executing a particular service is input by a user by the operation unit 302 (step S601), then writes service information relating to this service to the internal memory of the NFC tag unit 208 to update it (step S602). Note, a configuration may be taken such that the internal memory of the NFC tag unit 208 further stores a communication parameter for establishing the wireless LAN communication 104. The communication parameter includes wireless communication parameters required for performing wireless LAN communication such as an SSID which is a network identifier, an encryption method, an encryption key, an authentication method, a MAC address, an authentication key or the like. Also, an IP address for performing communication in an IP layer may be included.

Note, as a specific operation of the digital camera 101 in step S601, based on an input to the operation unit 202 from a user, an image or a moving image captured by the digital camera 101 that is held in the storage unit 203 is selected, and the selected image is displayed to the display unit 201. Additionally, the digital camera 101 receives an instruction to execute a service for the selected image or moving image that is made to be the target of processing, according to the input by the user to the operation unit 202.

Here "service" indicates a sequence of communication processes that is executed by performing communication between apparatuses. For example, there is a PLAY service, which is a service that is useable by a higher level application of Wi-Fi Direct, wherein moving image data is communicated and displayed. Also, a send service is another service for transmitting data to a partner device, and a PRINT service is for transmitting image data and causing it to be printed.

The "service information" described above is a message that includes service identification information and message type information. "Service identification information" is information for identifying a service uniquely, and is represented by a character string such as "wfds. play" or the like. Additionally, a configuration may be taken such that it is expressed in a format other than a character string such as a numerical value. "Message type information" is information showing whether service information is intended for advertisement of a service or for searching (request), or for both. In other words, message type information includes at least one of advertisement information that indicates that a service is executable to another communication apparatus, or request information that indicates that usage of a service provided by another communication apparatus is requested. In the present embodiment, an example will be explained wherein "Advertised" is recited when intending a service advertisement as a message type, and "Requested" is recited when intending a service request. Additionally, the message type information may also be information that indicates a role of the self-apparatus such as "Advertiser (an apparatus that advertises a service)" and "Seeker (an apparatus that searches for a service)" or the like. In this example, since the digital camera 101 searches for a service that is instructed by input by a user, in step S602 service information for which the message type information is made to be "Requested" is written to the internal memory of the NFC tag unit 208. Also, service information is associated with information that shows a request for a new connection by a communication method that is different from NFC.

In accordance with the user causing the digital camera 101 to approach the tablet PC 102, the digital camera 101 detects that the NFC communication 103 is established with the tablet PC 102 which is arranged with a reader/writer (R/W) (step S603). The digital camera 101, when NFC communication with a communication partner apparatus initiates in a state in which a service for which execution is requested is selected, performs communication for requesting making a new connection through wireless LAN and execution of said service by NFC with the communication partner apparatus. After this, the wireless LAN communication 104 waits to receive a service availability message from the tablet PC 102 (step S605). The service availability message is a message that notifies whether or not a service that corresponds to the service information that has been written to the NFC tag unit 208 can be provided by the partner apparatus of the NFC communication 103 (in other words the tablet PC 102). Receiving of the service availability message can be performed before connection processing of the wireless LAN communication 104, and for example, a Probe Request/Probe Response packet, or the like, is used for exchange.

Additionally, while a configuration in which the service availability message is received from the wireless LAN communication unit 209 is explained, the digital camera 101 is not limited to this. For example, a configuration may be taken in which the NFC tag unit 208 acquires the service availability message by the service availability message being written from the tablet PC 102. In such a case, when information is written from the tablet PC 102, the NFC tag unit 208 communicates (notifies) an interrupt signal that indicates that information was written to the control unit 205. Then the control unit 205 references the internal memory of the NFC tag unit 208 and analyzes the written information.

Additionally, in the present embodiment, an explanation is given for an interface of the wireless LAN communication unit 209 booting beforehand, however, the interface of the wireless LAN communication unit 209 may also be booted upon the establishment of the NFC communication 103. Also, configuration may be taken such that channel information of the wireless LAN communication 104 is included in service information that is stored to the internal memory of the NFC tag unit 208, and processing for waiting to receive a service availability message that is limited to a channel that is specified by this channel information may also be performed. Additionally, a configuration may be taken such that identification information for identifying a partner apparatus of the NFC communication 103 is included in the service information stored in the internal memory of the NFC tag unit 208, and only a service availability message that includes the identification information for identifying the partner apparatus is awaited. A hash value may be used for identifying a partner apparatus in the identification information. Also, configuration may be taken such that a message requesting that the service availability message be broadcasted to a peripheral apparatus, and a service availability message is received as a response. The request message may be transmitted using a channel of channel information that includes the service information. Additionally, a request message that includes the identification information (device identification information) of the partner apparatus of the NFC communication 103 may be transmitted. In such a case, a service from the apparatus that is specified by the device identification information is requested. Additionally, a start of transmission of a request message, may be performed at a point in time when the user operation of step S601 is accepted, or at a point in time when the NFC communication 103 of step S603 is established.

When a service availability message is received from the tablet PC 102, (YES in step S605), the digital camera 101 analyzes the message and determines whether or not the service defined in the service information by the tablet PC 102 is executable (step S606). When the service is executable (YES in step S606), connection processing of the wireless LAN communication 104 starts (step S607). Then, the digital camera 101 executes the service (step S608) through the wireless LAN communication 104 with the tablet PC 102, and processing ends (step S609). As an example of execution of a service of step S608, the digital camera 101, by transmitting moving image data selected using the wireless LAN communication 104 to the tablet PC 102, performs streaming play back of the moving image data to the tablet PC 102. Also as another example of execution of a service of step S608, the digital camera 101, by transmitting moving image data selected using the wireless LAN communication 104 to the tablet PC 102, causes the tablet PC 102 to display the moving image data. Also, when the communication partner apparatus is a printer, by transmitting image data selected using the wireless LAN communication 104 to the printer, the digital camera 101 causes the printer to print the image data.

Additionally, as an example of the connection processing in step S607, when the digital camera 101 operates as an AP, an internal memory communication parameter of the NFC tag unit 208 is stored. Then, waiting for a connection by the wireless LAN from the communication partner apparatus which reads the communication parameter is performed. Also, when the digital camera 101 operates as an STA, a communication parameter that is written to the NFC tag unit 208 from the communication partner apparatus is acquired. Then the wireless LAN communication unit 209 searches for the communication partner apparatus based on the acquired communication parameter through the wireless LAN communication, and by further performing authentication based on the acquired communication parameter the wireless LAN communication unit 209 establishes the wireless LAN communication with the communication partner apparatus.

Also, the connection processing includes processing defined by Wi-Fi Direct, Wi-Fi Protected Setup, Wi-Fi Protected Access, or the like. Also, the connection processing can execute processing for handover to wireless ALN communication from NFC communication based on the Wi-Fi Direct standard. Also, in step S609, the display unit 201 may display something to the effect that the usage of the service is complete.

On the other hand, when a service availability message cannot be received (NO in step S605), processing ends (step S610). As an approach to determining that the service availability message cannot be received, a configuration may be taken such that a timer is started upon establishment of the NFC communication 103 in step S603, and determining is performed according to whether or not a message could be received within a predetermined time. In other words, the elapsed time is counted from when it is detected that reading of the service information is performed by the NFC communication, and when a service availability message is not received before this elapsed time exceeds a predetermined time, NO can be determined in step 5605. Also, as a separate approach to the determination in step S605, a configuration may be taken such that determination is performed according to whether or not an instruction to interrupt processing is received from a user by the operation unit 202. Additionally, determination may be performed by combining these approaches. Note that, configuration may be taken such that the content of the internal memory of the NFC tag unit 208 is updated or deleted in accordance with which standard determination is based on one of these determination criterion. For example, configuration may be taken such that processing is performed so that the content of memory is not deleted when a service availability message cannot be received within a predetermined time, and so that the content of the memory is deleted when a processing interruption is instructed by a user operation. Additionally, content of the internal memory of the NFC tag unit 208 may be deleted or updated irrespective of determination criteria as described above. Note that, in step S610, it may be displayed to the display unit 201 that communication with the tablet PC 102 failed.

Meanwhile, when service cannot be executed (NO in step S606), the processing ends (step S611). Note that in step S611 the display unit 201 may display something to the effect the service cannot be used.

Note that, the digital camera 101 does not write service information where the message type information is made to be "Requested" to the internal memory of the NFC tag unit 208 in a state where a service for which execution is requested is not finalized. In other words, the digital camera 101 does not request the execution of a service when NFC communication is initiated with a communication partner apparatus in a state in which a service for which execution is requested is not selected.

A configuration may be taken such that, when a service for which execution is requested is not finalized, the digital camera 101 stores "Advertised" service information as the message type to the internal memory of the NFC tag unit 208, and the communication partner apparatus is notified of information of services that the self-apparatus can execute. Also, the digital camera 101 may be configured so as to store the communication parameter to the internal memory of the NFC tag unit 208 in a state in which a service for which execution is requested is not finalized.

By configuring in this way, the digital camera 101 may perform notification of service information of the self-apparatus and handover, without requesting performance of the service through NFC communication in a state in which a service for which execution is requested is not finalized.

As explained above, the digital camera 101 receives a service availability message about the service corresponding to the service information from a communication apparatus that read the service information from the NFC tag unit 208. Then based on this message it is automatically determined whether or not to start to use the service by wireless LAN with the communication apparatus. For this reason, a user can execute the service using the digital camera 101 without cumbersome settings.

Also, since the service for which execution is requested is written to the NFC tag unit 208 when the service for which execution is requested is finalized, the digital camera 101 may make a request for performance of the service to the partner apparatus even when the digital camera 101 is operating in a card emulation mode. Also, unnecessary handover performing is reduced since it is possible to acquire promptly whether or not it is possible to perform the service for which execution is requested after NFC communication on a partner apparatus.

(Operational Procedure of the Tablet PC)

Figure 7:
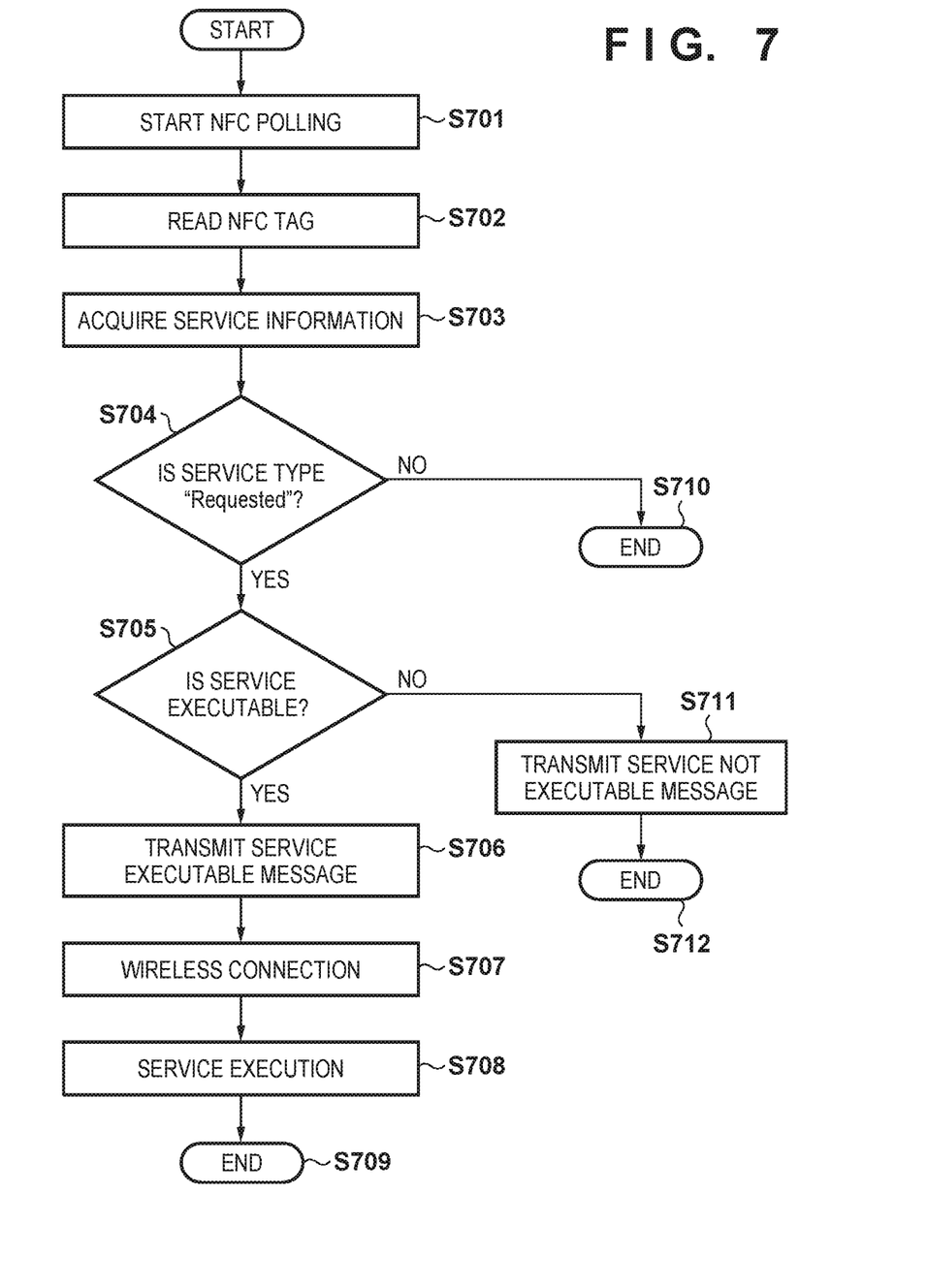
FIG. 7 is a flowchart for showing an operational flow of the tablet PC.

FIG. 7 is a flowchart for showing an operational procedure of the tablet PC 102. Firstly, the tablet PC 102 starts transmission of a polling command for detecting an NFC tag in the NFC communication unit 308 (step S701). When the digital camera 101 detects the NFC tag unit 208, data that is stored in the internal memory of the NFC tag unit 208 is read (step S702). Service information is acquired from the read data (step S703), and it is confirmed whether or not the message type is "Requested" (step S704). When the message type is "Requested" (YES in step S704), it is determined whether or not the tablet PC 102 is capable of executing the service indicated to service identification information (step S705). When the service is executable (YES in step S705), a service availability message indicating that the service is executable is transmitted to the digital camera 101 by the wireless LAN communication 104 (step S706).

Note that, while a configuration in which the tablet PC 102 transmits the service availability message by the wireless LAN communication unit 309 is explained, a configuration may be taken in which the digital camera 101 is notified of the service availability message by writing the service availability message to the NFC tag unit 208 of the digital camera 101 by the NFC communication unit 308.

Additionally, in the present embodiment, an explanation is given for an interface of the wireless LAN communication unit 309 booting beforehand, however, the interface of the wireless LAN communication unit 309 may also be booted upon the establishment of the NFC communication 103. Also, when channel information of the wireless LAN communication 104 is included in the internal memory of the NFC tag unit 208, a service availability message may be transmitted using that channel. Note that, when identification information of an apparatus is included in the internal memory of the NFC tag unit 208, a service availability message that includes the identification information of the apparatus may be transmitted. In this case, the digital camera 101 can determine whether or not to start usage of a service by wireless LAN with the tablet PC 102 based on the service availability message which includes the device identification information.

A service availability message may be transmitted as a response to receiving a message from the digital camera 101 requesting the service availability message. Also, reception of a request message or a response message may be performed using a channel indicated by channel information. Also, a configuration may be taken such that a response is performed only for a request message that includes apparatus identification information. Note that, a service availability message may be written to the internal memory of the NFC tag unit 208 using the NFC communication 103. Also, the service availability message may be communicated (notified) by being included in a message exchanged during connection processing in step S707.

Next, the tablet PC 102 starts connection processing for the wireless LAN communication 104 with the digital camera 101 (step S707), executes the service requested with the digital camera 101 (step S708), and the processing ends (step S709). Note that, in step S707, information and messages that were previously transmitted/received by the NFC communication 103 of information exchanged in connection processing for the wireless LAN communication 104 may be omitted.

Note that, as an example of the connection processing in step S707, when a communication parameter is stored to the internal memory of the NFC tag unit 208 of the digital camera 101, the tablet PC 102 searches for the wireless LAN communication for the digital camera 101 that operates as an AP based on the parameter as an STA. The tablet PC 102 establishes wireless LAN communication with the communication partner apparatus by performing authentication based on the acquired communication parameter. Also, when the tablet PC 102 operates as an AP, an internal memory communication parameter of the NFC tag unit 208 is written. Then, a network is built based on this communication parameter, and connection from the communication partner apparatus by wireless LAN is awaited. Also, the connection processing includes processing defined by Wi-Fi Direct, Wi-Fi Protected Setup, Wi-Fi Protected Access, or the like. Also, the connection processing can execute processing for handover to wireless ALN communication from NFC communication based on the Wi-Fi Direct standard.

Note that, in step S708, the tablet PC 102 receives moving image data selected on the digital camera 101 from the digital camera 101 using the wireless LAN communication 104, and performs streaming reproduction of the moving image data. Also, as an example of the service execution of step S708, the tablet PC 102 receives image data selected on the digital camera 101 using the wireless LAN communication 104 from the digital camera 101, and displays the image data.

On the other hand, when the message type that is read out from the NFC tag unit 208 of the digital camera 101 is not "Request" (NO in step S704), processing ends (step S710). Note that, in step S710, it may be displayed to the display unit 301 that communication with the digital camera 101 failed. Also, a configuration may be taken in which the tablet PC 102 executes connection processing (handover processing) for establishing the wireless LAN communication 104 when the message type is not "Request". Also, a configuration may be taken such that the tablet PC 102 selects the service that is to be executed with the digital camera 101, and executes the selected service through the wireless LAN communication 104 when the message type is "Advertised".

Also, a configuration may be taken such that when the tablet PC 102 initiates NFC communication with the digital camera 101 in a state where a service for which execution is requested is finalized and the message type read from the NFC tag unit 208 is not "request", the service that the tablet PC 102 requests is executed.

Also, a configuration may be taken such that when the tablet PC 102 initiates NFC communication with the digital camera 101 in a state where a service for which execution is requested is finalized and the message type read from the NFC tag unit 208 is "request", one of the requested services is performed preferentially, or configuration may be taken such that error termination is performed.

Also, when the service requested from the digital camera 101 cannot be executed (NO in step S705), a service availability message indicating that the service cannot be executed is transmitted to the digital camera 101 (step S711), and processing ends (step S712). Note that, in step S712, configuration may be taken such that it is displayed to the display unit 301 of the tablet PC 102 that the service cannot be executed.

As described above, when the tablet PC 102 receives service information from the NFC tag unit 208, determines whether or the a corresponding service is executable, and transmits a service availability message by wireless LAN based on the result. For this reason, search of a service can be performed without requiring cumbersome manual settings.

(Communication Sequence)

Figure 8:
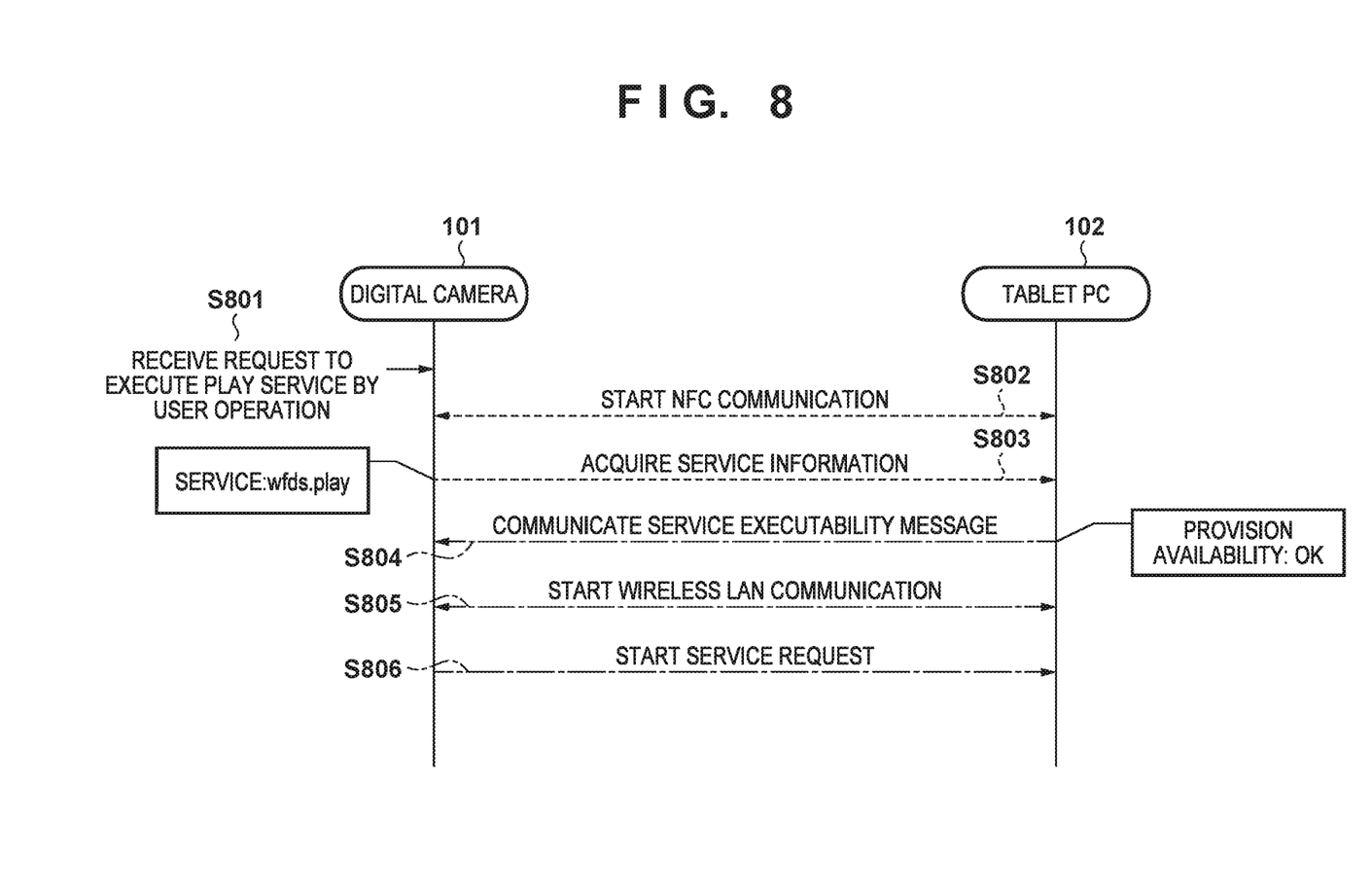
FIG. 8 is a view for illustrating an example of a sequence of communication between a digital camera and a tablet PC.

Next, as an example of a sequence of communication between the digital camera 101 and the tablet PC 102, an explanation will be given referencing FIG. 8. In FIG. 8, first, on the digital camera 101 side, an instruction for executing a Play service of Wi-Fi Direct by a user operation is accepted (step S801). At this time, the digital camera 101 writes to the internal memory of the NFC tag unit 208 service identification information that indicates the Play service of Wi-Fi Direct "wfds.play", and service information for which the message type is "Requested".

Next, when the NFC communication 103 is established between both parties according to a user operation of causing the digital camera 101 and the tablet PC 102 to approach each other (step S802), the tablet PC 102 reads service information from the NFC tag unit 208 of the digital camera 101 (step S803). The tablet PC 102 determines whether or not the self-apparatus is capable of executing the Play service of Wi-Fi Direct based on the service information that is read. Then, a service provision availability message indicating whether or not the service can be provided is communicated to the digital camera 101 through the wireless LAN communication 104 (step S804). Here, an explanation is given with the tablet PC 102 being capable of executing the Play service (OK). When the digital camera 101 recognizes that the service is useable by receiving the service provision availability message, connection processing for the wireless LAN communication 104 with the tablet PC 102 is started (step S805). When the connection of the wireless LAN communication 104 is established, the digital camera 101 transmits an initiation request for the Play service towards the tablet PC 102 and executes the service (step S806). Execution of the service is performed by transmitting moving image data selected on the digital camera 101, and the tablet PC 102 performing streaming reproduction of the moving image data.

As explained above, according to the present embodiment, by requesting provision of a service using an NFC tag, and confirming whether or not the service can be used, it is possible to specify a communication partner terminal capable of executing the service, and execute the service simply by an operation of causing the terminals to approach each other and so operationality is improved. Also, since it can be confirmed when the service cannot be executed by a service provision availability message, convenience is improved because it is possible to display an error to a user immediately. Also, by activating the wireless LAN interface upon establishment of the NFC communication, power consumption required to activate the interface can be suppressed. Also, by communicating channel information by an NFC tag, and receiving a service provision availability message using the channel, it becomes unnecessary to transmit/receive all channels of a wireless LAN communication, and it is possible to reduce the time required, and so convenience is improved. Also, by including identification information of the partner apparatus in an NFC tag and notifying, wireless LAN communication with the partner apparatus with which NFC communication is performed can be ensured, and since improper connections by a third party can be suppressed, security is improved. Also, by omitting the duplication of messages and information exchanged in NFC communication in the connection processing for the wireless LAN communication, the connection processing for the wireless LAN is optimized, and convenience is improved.

Note that, in the above described embodiment, the tablet PC 102 reads service information from the NFC tag unit 208 in accordance with the digital camera 101 approaching; however, the reading of the service information is not limited to this trigger. For example, the trigger may be a predetermined switch arranged on at least one of the digital camera 101 and the tablet PC 102 is selected by a user when the digital camera 101 and the tablet PC 102 are within a distance where NFC communication is possible of each other. Also, in the above described embodiment, while the tablet PC 102 determines service provision availability in accordance with service information being read from the NFC tag unit 208, the trigger for determining service provision availability is not limited to this. For example, the trigger may be the determination of service provision availability being requested of the tablet PC 102 by the digital camera 101.

As described above, according to embodiments of the present invention, simply by performing an operation of causing terminals to approach each other, a communication partner terminal that is capable of executing a desired service is specified, and the desired service can be executed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-148162, filed on Jul. 18, 2014, which is hereby incorporated by reference herein in its entirety.

The invention claimed is:

1. A communication apparatus, comprising:
    a storage unit adapted to, in the case where a service executed by a second wireless communication method is selected, store service information corresponding to the service which can be read by another communication apparatus by a first wireless communication method;
    a communication unit capable of communicating with the other communication apparatus by the second wireless communication method,
    an acquiring unit adapted to acquire from the other communication apparatus, which read the service information from the storage unit, a message indicating whether or not a service corresponding to the service information is executable;
    a determination unit adapted to determine, based on the message, whether or not to start execution of the service by the second wireless communication method with the other communication apparatus; and
    a detection unit adapted to detect that reading of the storage unit by the first wireless communication method is performed by the other communication apparatus,
    wherein the determination unit determines whether or not to start execution of the service based on the message which the acquiring unit acquired after it is detected that reading of the storage unit is performed.

2. The communication apparatus according to claim 1, wherein communication is possible by the first wireless communication method in a case where the other communication apparatus approaches within a predetermined distance of the communication apparatus.

3. The communication apparatus according to claim 1, wherein service information includes at least one of advertisement information that indicates that a service is executable to the other communication apparatus, and request information that indicates that execution of a service that the other communication apparatus provides is requested.

4. The communication apparatus according to claim 1, wherein the service information includes service identification information that identifies the service.

5. The communication apparatus according to claim 1, wherein
    the service information includes channel information for specifying a channel used in communication with the other communication apparatus by the second wireless communication method, and
    the acquiring unit acquires the message by using the channel specified by the channel information.

6. The communication apparatus according to claim 1, wherein
    the service information includes device identification information that identifies the other communication apparatus, and
    the determination unit determines whether or not to start usage of the service by the second wireless communication method with the other communication apparatus based on the message which includes the device identification information.

7. The communication apparatus according to claim 1, wherein
    further comprising a writing unit adapted to write the service information to the storage unit, wherein
    the acquiring unit acquires from the other communication apparatus which read the service information written by the writing unit the message corresponding to the service information.

8. The communication apparatus according to claim 7,
    further comprising an instruction input unit adapted to input an instruction from a user wherein
    the writing unit writes service information corresponding to the input instruction to the storage unit.

9. The communication apparatus according to claim 1, further comprising a broadcast unit adapted to broadcast by the communication unit information that requests the message upon the detection unit detecting that reading of the storage unit is performed.

10. The communication apparatus according to claim 1, further comprising:
a time counting unit adapted to time an elapsed time from when the detection unit detects that reading of the storage unit is performed, and
a display control unit adapted to display to a display unit that the acquiring unit did not acquire the message even though the elapsed time exceeds a predetermined time in such a case.

11. The communication apparatus according to claim 1, wherein in a case where the determination unit determines to start execution of the service, the communication unit starts the execution of the service by establishing a connection by the second wireless communication method with the other communication apparatus.

12. A communication control method of a communication apparatus, comprising the steps of:
storing in a storage unit, in the case where a service executed by a second wireless communication method is selected, service information corresponding to the service which can be read by another communication apparatus by a first wireless communication method;
communicating with the other communication apparatus by the second wireless communication method,
acquiring from the other communication apparatus, which read the service information from the storage unit, a message indicating whether or not a service corresponding to the service information is executable;
determining, based on the message, whether or not to start execution of the service by the second wireless communication method with the other communication apparatus;
detecting that reading of the storage unit by the first wireless communication method is performed by the other communication apparatus, and
determining whether or not to start execution of the service based on the acquired message after it is detected that reading of the storage unit is performed.

13. A non-transitory computer-readable storage medium storing a computer program for causing a computer to execute steps in a communication control method of a communication apparatus, the control method comprising the steps of:
storing in a storage unit, in the case where a service executed by a second wireless communication method is selected, service information corresponding to the service which can be read by another communication apparatus by a first wireless communication method;
communicating with the other communication apparatus by the second wireless communication method,
acquiring from the other communication apparatus, which read the service information from the storage unit, a message indicating whether or not a service corresponding to the service information is executable;
determining, based on the message, whether or not to start execution of the service by the second wireless communication method with the other communication apparatus;
detecting that reading of the storage unit by the first wireless communication method is performed by the other communication apparatus, and
determining whether or not to start execution of the service based on the acquired message after it is detected that reading of the storage unit is performed.

\* \* \* \* \*